No. 637,428. Patented Nov. 21, 1899.
F. E. & F. O. STANLEY.
VAPORIZING ATTACHMENT FOR BURNERS.
(Application filed Aug. 9, 1899.)

(No Model.) 2 Sheets—Sheet 1.

Witnesses  
J. G. Hinkel  
Arthur A. Fisher

Inventors  
Francis E. Stanley  
Freelan O. Stanley  
by Forbes Freeman Attorneys

THE NORRIS PETERS CO., PHOTO-LITHO., WASHINGTON, D. C.

No. 637,428. Patented Nov. 21, 1899.
F. E. & F. O. STANLEY.
VAPORIZING ATTACHMENT FOR BURNERS.
(Application filed Aug. 9, 1899.)
(No Model.) 2 Sheets—Sheet 2.

UNITED STATES PATENT OFFICE.

FRANCIS E. STANLEY AND FREELAN O. STANLEY, OF NEWTON, MASSACHUSETTS.

VAPORIZING ATTACHMENT FOR BURNERS.

SPECIFICATION forming part of Letters Patent No. 637,428, dated November 21, 1899.

Application filed August 9, 1899. Serial No. 726,696. (No model.)

*To all whom it may concern:*

Be it known that we, FRANCIS E. STANLEY and FREELAN O. STANLEY, citizens of the United States, residing at Newton, in the county of Middlesex and State of Massachusetts, have invented certain new and useful Improvements in Vaporizing Attachments for Burners, of which the following is a specification.

In that class of burners in which a liquid hydrocarbon is volatilized and the gas burns either alone or combined with air it is common to start the volatilization of the liquid by first heating the liquid-conducting pipe by burning a small portion of liquid, as alcohol, gasolene, &c., in a suitable receptacle. This is objectionable for many reasons. Alcohol is expensive, gasolene smokes up the tubes, and it is difficult to control the flame of either as thus burned, and there is liability of accident and of setting fire to surrounding objects. To avoid these objections, we make use of a movable or detachable vaporizer, which may be heated apart from the burner and then put into communication with the supply-pipe, as fully set forth hereinafter and as illustrated in the accompanying drawings, in which—

Figure 1:
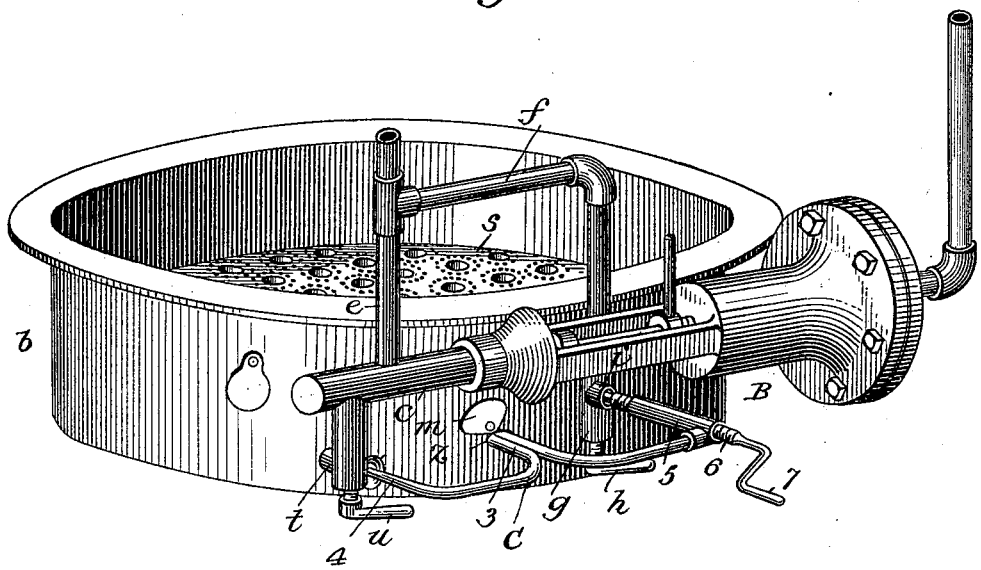
Figure 2:
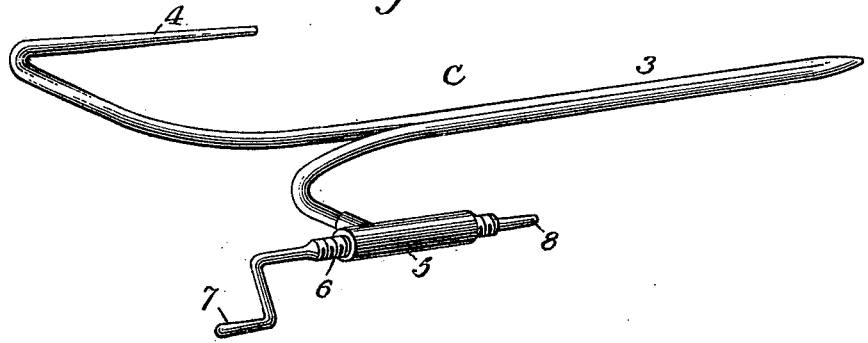
Figure 3:
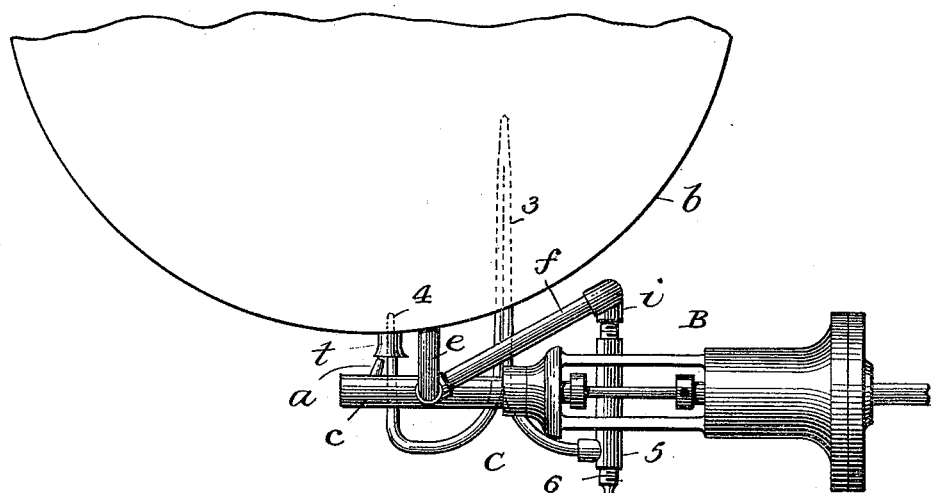
Figure 4:
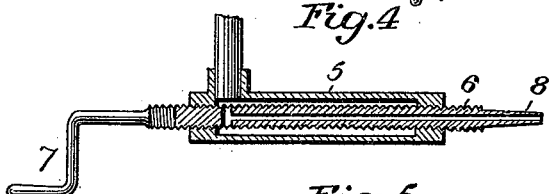
Figure 5:
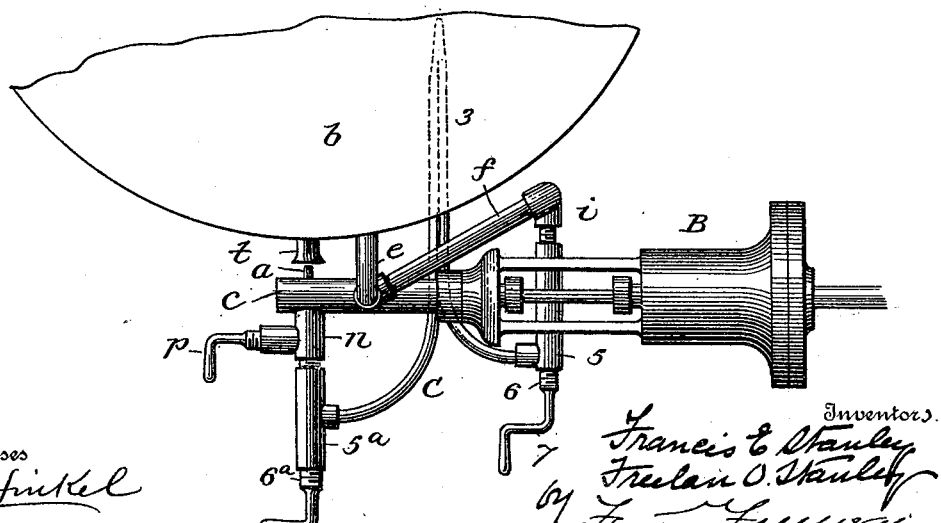

Figure 1 is a perspective view showing one form of burner to which our device is applicable with said device in position. Fig. 2 is a perspective view of the device. Fig. 3 is a plan of Fig. 1, the burner being covered. Fig. 4 is an enlarged section of part of the device, and Fig. 5 illustrates in plan a modification of the construction shown in Figs. 1 and 2.

For illustration we have shown our device in connection with a burner *b*, consisting of a hollow casing, having an inlet-tube *t*, into which projects a nozzle *a* from the outlet-tube *c* of a regulator B so constructed that any undue pressure in the regulator (which is connected with the boiler) will close in whole or in part the outflow to the nozzle *a*. As this regulator constitutes no part of this invention, it will not be further described. The regulator receives its supply of vapor from a pipe *e*, communicating with the oil-pipe passing through the boiler, and a branch *f* is provided at the lower end with a casing *g*, having a nipple *i* at one side, and above the latter the outlet is closed by a valve at the end of a valve-stem *h*. The passage to the nozzle *t* is closed by a valve at the end of a valve-stem *u*.

In the side of the burner-casing above the burners is a hole *z*, which can be closed by a hinged cover *m*. In the normal operation of this form of burner the liquid is vaporized in the pipe *e*, acquires a high pressure by expansion, and the vapor passes to the nozzle *a* and issues as a forcible jet and carries with it into the tube *t* a portion of air, the mixture thence passing upward through perforations in the burner-plate *s* and being burned above the latter. When, however, the apparatus has been put out of operation, there is only liquid in the pipe *e*, and to vaporize this liquid we make use of an attachment which we will now describe.

The device C, as shown, consists of a tube bent upon itself to form the stem 3, one branch of which terminates in the forwardly-projecting nozzle 4, while the other is provided with the hollow casing 5, into which screws a tubular stem 6, provided with a handle 7 at one end and terminating at the other in a nozzle 8, the inner end of the stem 6 being adapted to the nipple *i*, which is threaded internally to receive the said stem.

When the burner has to be started, the stem 3 and nozzle 4 of the device are inserted in a fire or held in a flame until heated to the requisite temperature—say 200° more or less—and the said stem 3 is then inserted through the opening *z* in the side of the casing of the burner above the top plate *s* thereof, the nozzle 4 extending into the mouth of the mixing-tube *t*, while the nozzle 8 extends into the nipple *i* in the casing *g*. The screw-stem 6 being turned so as to screw into the nipple of the casing *g*, the valve-stem *h* is turned to open its valve, when the oil will flow from the pipe *f* and through the casing *g* and nozzle 8 and casing 5 into the stem 3 and back and forth therein, being volatilized by the heat thereof, and will pass as a forcible jet from the nozzle 4 into the mixing-tube *t* and to the interior of the burner-casing, after which the application of a match above the plate *s* will at once ignite the gaseous mixture at all of the openings. Thereafter the flame at the burners will heat the stem 3, which remains in position until the parts of the burner are so heated that the volatilization of the oil will continue without the necessity of the igniting device, when the valve of the casing $g$ is closed and the igniting device is withdrawn and the valve-stem $u$ is turned to permit the burners to be supplied through the nozzle $a$. By this means the oil may be volatilized and the flame of the burner started without the necessity of bringing a lamp or heater in proximity to the burner.

It will thus be seen that the vaporizer for starting the production of gas is heated at a distance from the apparatus, so that it is not necessary to produce any flame adjacent to the latter until the burner is lighted.

We have shown one form of burner; but it will be evident that the device, modified according to conditions, may be used with any of the various forms of burners where the igniting tip or opening or openings communicates normally with a supply-pipe and that the vaporizer device may have an independent nozzle, as shown, or may be adapted for connection with the usual nozzle $a$ or its conducting-pipe. Thus in Fig. 5 the device is shown as provided with a casing $5^a$ for a screw-nozzle stem $6^a$, like the stem 5, adapted to a nipple $n$ on the outlet-tube $c$. In this case the valve on the stem $u$ controls the flow from the tube $c$ to the nozzle $a$, while a second valve on a stem $p$ cuts off connection with the nipple $n$.

Without limiting ourselves to the construction shown, we claim—

1. The within-described device for starting a vapor-burner supplied with volatile liquid, the same consisting of a detachable tubular heater, and means for temporarily connecting it with the liquid-supply reservoir, said device having a nozzle for passing the vapor to the burner, substantially as set forth.

2. A vaporizing device for burners consisting of a tube adapted to be heated when detached from the burner, and means for connecting the said tube in the line of supply to the burner, substantially as set forth.

3. The combination of a vapor-burner having a pipe for conducting volatile liquid toward the burner, a detachable vaporizing-tube, with means for connecting it in the line of liquid-supply to the burner, and valves arranged to control the flow of liquid to the vaporizing-tube, substantially as set forth.

4. The combination of a vapor-burner having a pipe for conducting volatile liquid toward the burner and a nozzle communicating with said pipe, a detachable vaporizing-tube also provided with a nozzle, with means for connecting it in the line of liquid-supply to the burner, and valves arranged to control the flow of liquid to the vaporizing-tube, substantially as set forth.

5. The combination of the burner-casing and means for supplying a combustible mixture thereto, and a casing above and surrounding the burner and inclosing a combustion-chamber and provided with an opening $z$ for the reception of a detachable vaporizer, substantially as set forth.

In testimony whereof we have signed our names to this specification in the presence of two subscribing witnesses.

FRANCIS E. STANLEY.
FREELAN O. STANLEY.

Witnesses:
MARGARET L. HART,
EMMA E. WALKER.